350-96.21 SR
XR 3,857,361

United States Patent [19]

Gibson et al.

TX 3076N

[11] 3,857,361
[45] Dec. 31, 1974

[54] COMBINED VHF AND UHF DISPLAY SYSTEM

[75] Inventors: Richard D. Gibson, Wilbraham; Robert D. Whelan, West Springfield, both of Mass.

[73] Assignee: General Instrument Corporation, Newark, N.J.

[22] Filed: Dec. 19, 1973

[21] Appl. No.: 426,331

[52] U.S. Cl. ............ 116/124.4, 240/1 EL, 240/2.1, 250/227, 325/464, 334/86, 350/96 B
[51] Int. Cl. ............ H03j 1/04
[58] Field of Search ............ 116/124.1, 124.2, 124.3, 116/124.4, 129 L; 340/202; 250/227; 350/96, 96 B, 110; 325/455, 464; 334/86, 87; 240/1 EL, 2.1

[56] References Cited

UNITED STATES PATENTS

| | | | |
|---|---|---|---|
| 2,498,436 | 2/1950 | Tiegras | 116/124.1 |
| 3,322,094 | 5/1967 | Kelso | 116/124.4 |
| 3,349,406 | 10/1967 | Perry et al. | 250/227 X |
| 3,538,312 | 11/1970 | Genahr | 350/96 B X |
| 3,639,747 | 2/1972 | Schmidt | 116/124.4 |
| 3,677,619 | 7/1972 | Mackenzie | 116/129 L |
| 3,726,250 | 4/1973 | Merk | 116/129 L |

*Primary Examiner*—Louis J. Capozi

[57] ABSTRACT

A channel numeral display system for use in television tuners or the like of the type having VHF and UHF band tuners and separate rotary control shafts to condition each of the tuners includes separate VHF and UHF displays having a common display area. A stationary mask is provided having a transparent portion which constitutes the common display area. Situated behind the display area is a first movable mask having a plurality of active portions and a passive transparent portion. The first movable mask is connected to the VHF selector shaft to be driven thereby. Each of the active portions has a series of dot recesses arranged in a format representative of the numeral corresponding to a VHF channel. A means of illuminating the first movable mask in an edgewise fashion is provided such that the portion thereof aligned with the display area is visible. A second movable mask is operably connected to the selector shaft of the UHF tuner to be driven thereby. A fiber optic bundle is provided having a light input end situated adjacent the second movable mask and a light output end aligned with the display area. Means are provided for directing light through the second movable mask to the light input end of the fiber optic bundle. The first rotatable mask is interposed between the light output end of the fiber optic bundle and the display area. Switch means are provided such that the first rotatable mask is illuminated when one of the active portions thereof is aligned with the display area, but when the passive portion of the first movable mask is aligned with the display area, the second movable mask is illuminated thereby permitting the output end of the fiber optic bundle to be visible.

9 Claims, 1 Drawing Figure

Figure 1:
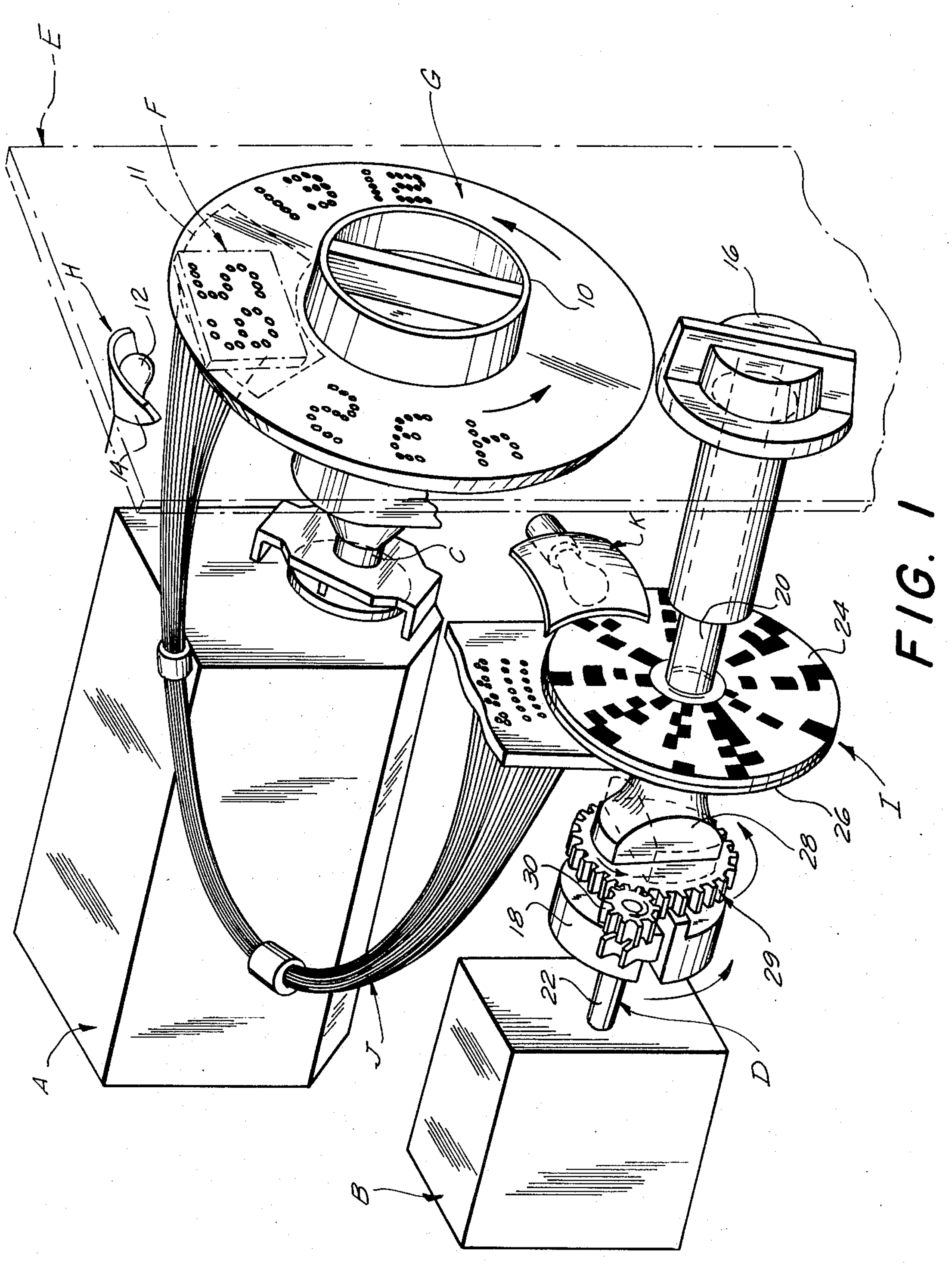

3857361
OR IN 116/124.4

PATENTED DEC 3 1 1974

3,857,361

COMBINED VHF AND UHF DISPLAY SYSTEM

This invention relates to channel indicia display devices and more particularly to a display device for use in a television tuner or the like having UHF and VHF capability wherein separate but compatible display devices are utilized to form similarly appearing UHF and VHF channel indicia displays at a common display area.

For as long as television receivers have been produced, manufacturers have been looking for new and better ways to display the number corresponding to the channel which the user of the television set has selected. A conventional method which has proved adequate for use in televisions having only VHF receiving capability is the standard disc arrangement because of the very limited number of channels present in this frequency band.

However, as televisions having UHF tuning capability in addition to the VHF tuning capability become increasingly popular, it has become important for television receiver manufacturers to incorporate channel display devices in their television sets for displaying numerals corresponding to the UHF channels as well. Because of the great number of channels available in the UHF band, standard disc arrangements have proved inadequate. Conventional methods of displaying UHF channel numbers have taken various forms including digital geneva wheels, straight wheels, continuous film strips, geneva digital dials and standard knob arrangements. When adopted to provide a display for the seventy UHF channels, these conventional methods demonstrate one or more of the following drawbacks: poor number registration between the units in the tens digits displayed, poor number registration of the digits with respect to the display window, uneven illumination of the numerals displayed, direct viewing of display numerals requiring each numeral to be large enough for comfortable viewing and therefore causing the entire display to take up a great deal of space, the display location with respect to the control knobs being determined by the physical structure of the display instead of being a matter of design choice, nonadaptability to preset UHF channel selection, too much space required for the display device and, in particular, the difficulty of producing a sturdy and reliable display device at a competitive cost. These problems are compounded if both the VHF channel display and the UHF channel display are incorporated into a single device.

But using separate display devices for UHF and VHF does not solve the problem. In addition to the drawbacks inherent in a UHF display, as set forth above, it is usually advantageous to use a common display area for both VHF and UHF. This presents an additional problem — it is desirable that the UHF display be compatible in appearance with the VHF display, that is to say, the numerals displayed should be similar in appearance whether they are representative of a channel in the UHF band or a channel in the VHF band.

It has been found that fiber optic display systems can be advantageously used in the UHF display. When properly engineered, fiber optic display devices can display patterns which are envenly illuminated throughout and have the proper registration between the digits of the channel number and between the channel number and the display window. They can produce an apparent magnification of the display pattern to display numerals of adequate size for comfortable viewing, and the display location is not rigidly present with respect to the location of the control knobs. Further, this type of display device takes up a minimum amount of space in the tuner and can be produced at a reasonable cost.

Thus, it appears that cost and size requirements dictate the use of a conventional type display device for the VHF channels and a fiber optic type display device for the UHF channels. However, in order to utilize such a system, compatibility considerations must be taken into account, so that the numerals from each of the displays are similar in appearance and visible in a common viewing area.

It is, therefore, a prime object of the present invention to provide a channel indicia display system for use in television receivers or the like having both VHF and UHF capability wherein the display devices are compatible with each other and the displays similar in appearance to each other.

It is another object of the present invention to provide a channel indicia display system for use in television tuners or the like having UHF and VHF capability wherein a common display area is utilized.

It is a further object of the present invention to provide a channel indicia display system for television tuners or the like having UHF and VHF tuning capability wherein the system takes up a minimum amount of space and can be produced at an economically feasible cost from sturdy and reliable parts.

It is still a further object of the present invention to provide a channel indicia display system for use with television tuners or the like having UHF and VHF capability which does not suffer from the drawbacks of poor numeral registration and which displays numerals of adequate size for comfortable viewing.

In accordance with the present invention a stationary mask is provided having a transparent portion defining a common display area for both UHF and VHF numerals. The VHF display comprises a first movable mask operably connected to the VHF channel selector shaft to be driven thereby. The first movable mask has a plurality of active portions and a passive transparent portion thereon. Each of the active portions has a plurality of dot recesses arranged in a format to represent a numeral corresponding to a VHF channel. A means of edge lighting the first movable mask is provided such that when one of the active portions is aligned with the display area a numeral corresponding to the VHF channel to which the tuner is set is visible in the form of a plurality of dots.

The UHF portion of the device comprises a second movable mask operably connected to the UHF selector shaft to be driven thereby. A fiber optic bundle is provided having a light input end situated adjacent the second movable mask and a light output end situated in alignment with but spaced from the display area. The first movable mask is interposed between the light output end of the fiber optic bundle and the display area. A light source is situated to direct light through the second movable mask to the light input end of the fiber optic bundle. When the light is energized, the second movable mask blocks the light from certain selected fibers in the input end of the fiber optic bundle and permits light to enter the remaining fibers. The numerals displayed at the output end of the fiber optic bundle are thus formed by light emanating from the fibers at the output end of the bundle. This type of fiber optic display, in one general embodiment, is disclosed in copending application Ser. No. 379,212, filed July 16, 1973, entitled "Coding Arrangement For Fiber Optic Digital Display Device," in the name of Richard D. Gibson and Robert D. Whelan, and assigned to the assignee of this application.

Switch means are utilized such that the first mask is illuminated when any of the active portions thereof are aligned with the display area. However, when the passive transparent portion of the first mask is aligned with the display area, the second mask is illuminated such that numerals corresponding to the UHF channels are visible at the display area.

Dot recesses are utilized on the first mask such that when it is illuminated the numerals displayed are similar in appearance to the numerals displayed by the fiber optic bundle. Thus, the VHF display and the UHF display form an integrated system which utilizes a common viewing area, takes up a minimum amount of space, and can be produced at a commercially feasible cost. Further, the display demonstrates the advantages of a conventional type display system for VHF tuning and a fiber optic type display system for UHF tuning in a single system.

To the accomplishment of the above, and to such other aspects as may hereinafter appear, the present invention relates to a display system for use with television receivers having both UHF and VHF tuning capability as defined in the appended claims and as described in the specification, taken together with the accompanying Drawing which shows an isometric view of a preferred embodiment of the present invention.

The present invention is to be utilized in a television receiver or the like having both UHF and VHF tuning capability. Tuner mechanisms capable of being conditioned to select either a UHF channel or a VHF channel are known to the art and take many forms. These tuner mechanisms form no part of the present invention and therefore are not described herein, however, they may comprise a variable condenser tuned transmission line or the like.

The present invention is to be utilized with a VHF tuning mechanism, generally designated A, and a UHF tuning mechanism, generally designated B. A rotary control shaft, generally designated C, extends from the VHF tuner A and is rotatable to corporeally condition tuner A to select the desired VHF channel. Preferably, shaft C extends to the exterior of the receiver and is provided with a control knob 10 on the end thereof a facilitate rotation of the shaft. Likewise, a rotary control shaft, generally designated D, extends from UHF tuner B in order to corporeally condition this tuner mechanism to select the appropriate UHF channel. Shaft D also extends to the exterior of the set and has a control knob 16 associated therewith.

An opaque stationary mask, generally designated E, is provided with a transparent portion generally designated F, which forms the common display area for both the VHF and UHF channel indicia. Mask E may form a part of the set housing (not shown) or be a separate piece of opaque material affixed thereto. Situated immediately behind stationary mask E is a first rotatable mask, generally designated G, which has a plurality of numerals circumferentially disposed along one surface thereof. Each of these numerals is preferably composed of a series of dot recesses which are arranged in the appropriate format to represent one of the VHF channels. Mask G is formed of a transparent material such as plexiglass, preferably with an opaque backing. The dot recesses which form the numerals extend perpendicularly from the back surface of the mask partially through the depth thereof. The transparent material has light transmissive properties which permit light to travel within the mask. The dot recesses redirect the light transmitted in the transparent material toward the front of the mask such that the recesses appear as point light sources. The opaque backing in addition to providing a high contrast ratio, prevents the viewer from looking through mask G at the fiber optic end illuminated by stray light. The opaque backing on mask G has a transparent portion situated between the numeral 2 and the numeral 13. A means, generally designated H, is provided to illuminate the edge of mask G such that light is transmitted within the mask and the numeral aligned with portion F can be viewed.

A second rotatable mask, generally designated I, is operably connected to rotary control shaft D. A fiber optic bundle, generally designated J, has a light input end adjacent mask I and a light output aligned with but spaced from transparent portion F with mask G interposed therebetween. A source of illumination, generally designated K, is situated to illuminate the light input end of fiber optic bundle J. Mask I is interposed between light source K and the input end of fiber optic bundle J such that the light from light source K is blocked from entering certain of the fibers in bundle J. The light emanating from the fibers in the output end of bundle J is visible through transparent portion F to form the UHF channel indicia display.

Preferably, mask G comprises a disc-shaped body fixedly mounted on shaft C for rotation therewith. Mask G has a plurality of active portions, each of which has a series of dot recesses in a format representing a particular one of the VHF channels thereon. Preferably, these dot recesses are on the rear surface of mask G which is covered with an opaque layer except at the passive portion thereof. The active portions of mask G have numerals from 2 to 13 thereon. In the space between the numerals 2 and 13 is a passive transparent portion 11 which permits viewing of the output end of the fiber optic bundle J through mask G. As knob 10 and control shaft C are rotated, mask G is rotated simultaneously such that the numeral corresponding to the VHF channel to which the set is tuned is aligned with transparent portion F. When the receiver is tuned to any of the VHF channels, the illuminating means H is energized.

Illuminating means H comprises a light bulb 12 and a light reflector 14. Bulb 12 and reflector 14 are situated such that the mask G is illuminated in an edgewise manner causing each of the dot recesses to appear to be a separate light source thereby giving the overall appearance of a plurality of point light sources arranged in a specific format. Preferably, the peripheral edge of mask G is beveled for two reasons, the first of which pertains to the location of mask G relative to stationary mask E. The beveling permits light source H to be located a small distance behind the plane of mask G and still provides edgewise illumination. In addition, the beveling of the edge serves to permit incident light to be reflected and scattered by the interior of the front surface of mask G. This system provides the same level of illumination for each dot recess. This display technique is perferable because it permits the VHF channel indicia to be similar in appearance to the UHF channel indicia which are produced by means of fiber optic bundle J.

As the conventional in tuners having VHF and UHF tuning capability, when a UHF channel is to be tuned, knob 10 is rotated until the transparent portion of mask G is aligned with transparent portion F of stationary mask E. At this point, a switch (not shown) automatically de-energizes light source H and energizes light source K, thus permitting a UHF channel display.

The UHF channels are selected by means of rotating UHF control shaft D. In the exemplary embodiment of the UHF tuner and control assembly here illustrated, details of which form no part of the present invention, knob 16 is operably connected to UHF tuner mechanism B by means of a shaft 22. A gearing system 18, known as a geneva gear, is used to control the movement of mask 26. Geneva gear 18 is connected to knob 16 by means of a shaft 22.

Interposed between knob 16 and geneva gear 18 is rotatable mask I. Mask I comprises two discs, 24 and 26, for controlling the units and tens indications, respectively. Each of the discs 24 and 26 is individually rotatable about a common axis and are situated immediately adjacent each other. Each of the discs 24 and 26 has a plurality of masking sectors situated on the surface thereof. Preferably, each of the discs 24 and 26 is sectioned into ten 36° sectors, half or 18° of which is used for masking and the other half or 18° of which if transparent and therefore passive. The transparent sectors are used as windows to transmit light to the adjacent disc. Each 18° masking subsector is preferably broken into ten radial increments to correspond to each of the groups of fibers at the input end of bundle J. The tens digit disc 26 is operably connected to the gear 18 by means of shaft 28 and gear 29 and gear 30. The units digit mask 24 is mounted on shaft 20 and therefore driven by the rotation of selector knob 16. Each time mask 24 makes a 360° rotation, geneva gear 18 causes gear 29 and thus mask 26 to rotate through an arc of 36°. This motion occurs during the last 36° rotation of mask 24.

The input end of fiber optic bundle J is arranged within a 36° sector of a circle and aligned with a 36° sector of mask I. Preferably, fiber optic bundle J contains enough fibers to produce two separate numerals, a tens digit and a units digit, at area F. The input end of the fibers which will produce the units digit are aligned with one of the 18° mask subsectors of disc 24 and the input end of the fibers which will produce the tens digit are aligned with the 18° mask subsector of mask 26 immediately adjacent to it.

Masks 24 and 26 are rotatably offset by 18°. Hence, each 18° masking subsector of each disc will always be aligned with an 18° transparent subsector of the other mask. In this way, each mask is active on one-half of the 36° sector of the input end of fiber optic bundle J. The light from source K will pass through one of the 18° active subsectors in disc 24 and the immediately adjacent 18° mask active subsector in mask 26 simultaneously, thus causing both digits to appear in a side-by-side relationship at transparent area F.

In this way, both the UHF and VHF display mechanisms are compatible and display numerals which are similar in appearance at a common display area. Further, the display systems takes up a minimal amount of space in the receiver and is producible at a commercially feasible cost. Moreover, the desired aspects of conventional display devices are utilized in the VHF display portion of the device and the desirable aspects of fiber optic displays are utilized in the UHF portion of the device, thus incorporating the best of both of these types of display devices in a single system.

A preferred embodiment of the present invention has been specifically disclosed herein for purposes of illustration. It is apparent that many modifications and variations may be made upon the specific structure disclosed herein. It is intended to cover all of these variations and modifications which fall within the scope of this invention as defined by the appended claims.

We claim:

1. A channel indicia display system for use in television tuners or the like of the type having first and second frequency band tuners and separate rotary control shafts to condition each of the tuners, the display comprising a stationary mask having a transparent portion, a first movable mask having a plurality of active portions and a passive portion, said first mask being operably connected to one of the shafts to be driven thereby and means illuminating said first movable mask such that the portion thereof aligned with the transparent portion of said stationary mask is visible, a second movable mask, said second movable mask operably connected to the other of the shafts to be driven thereby, a fiber optic bundle having a light input end and a light output end, said light input end being situated adjacent said second mask and said light output end being situated in alignment with said transparent portion of said stationary mask with said first movable mask interposed therebetween, means for directing light through said second movable mask to said light input end, and switch means for de-energizing said illuminating means and energizing said light directing means when said passive portion of said first movable mask is aligned with said transparent portion of said stationary mask.

2. The display of claim 1 wherein the active portions of said first mask when illuminated simulate in appearance the light output end of said fiber optic bundle.

3. The display of claim 2 wherein said illuminating means comprises a light source, said source being situated to direct light toward the edge of said first movable mask.

4. The display of claim 3 wherein each of the active portions of said first rotatable mask has a plurality of dot recesses thereon arranged in a predetermined format, said recesses being situated on the rear surface of said first movable mask.

5. The display of claim 1 wherein said illuminating means comprises a light source, said source being situated to direct light toward the edge of said first movable mask.

6. The display of claim 5 wherein each of the active portions of said first rotatable mask has a plurality of dot recesses thereon arranged in a predetermined format, said recesses being situated on the rear surface of said first movable mask.

7. The display of claim 1 wherein said illuminating means and said light directing means are independently operable.

8. The display of claim 7 wherein the active portions of said first mask when illuminated simulate in appearance the light output end of said fiber optic bundle.

9. The display of claim 8 wherein each of the active portions of said first rotatable mask has a plurality of dot recesses thereon arranged in a predetermined format, said recesses being situated on the rear surface of said first movable mask.

* * * * *